Nov. 15, 1955  J. A. LEMOUZY  2,724,023
ELECTRONIC BALANCED AMPLIFIER
Filed May 7, 1954
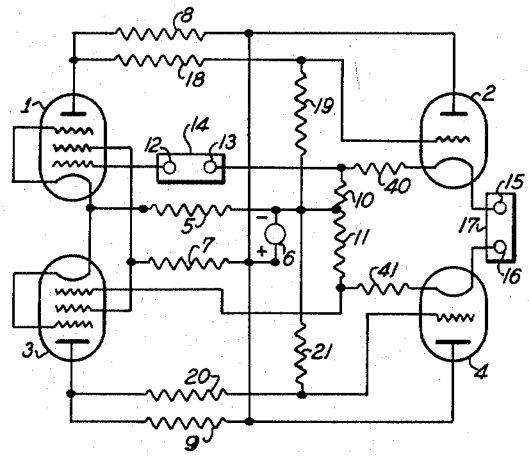
Fig. 1
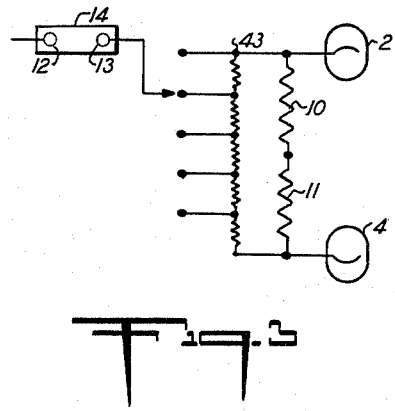
Fig. 3
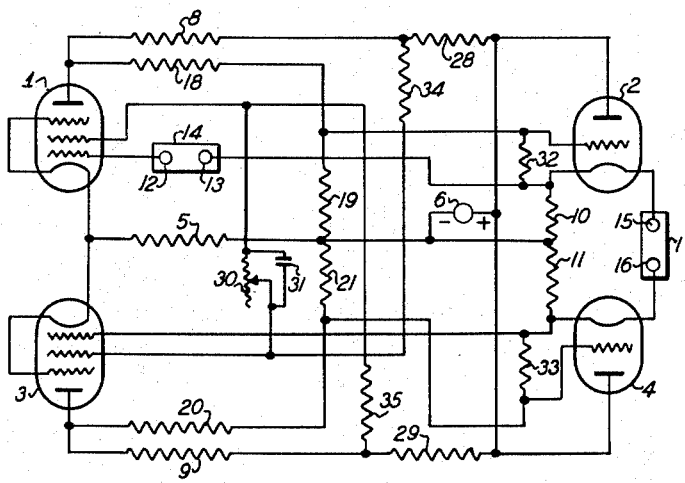
Fig. 2
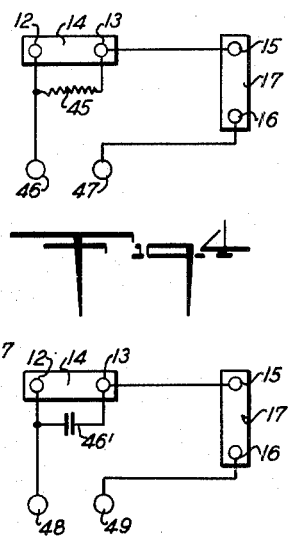
Fig. 4
Fig. 5

United States Patent Office 2,724,023
Patented Nov. 15, 1955

---

2,724,023

ELECTRONIC BALANCED AMPLIFIER

Joseph Antoine Lemouzy, Paris, France

Application May 7, 1954, Serial No. 428,330

Claims priority, application France May 18, 1953

6 Claims. (Cl. 179—171)

---

It is a well-known fact that electronic measuring instruments including vacuum tubes are adapted to measure direct or alternating current voltages or intensities without tapping practically any substantial amount of energy off the supply during the measuring procedure, which cuts out any possibility of disturbance.

In other terms, and from another standpoint, an electronic measuring instrument may be considered as constituted chiefly by a converter between the output terminals of which it is possible to connect measuring means with a comparatively small internal resistance without this internal resistance exerting any substantial action on the extremely high apparent resistance of the input side of the instrument as viewed from the supply to be measured, while the voltage measured at the output end of the instrument is equal to the voltage applied to the input end.

Fig. 1 of accompanying drawings illustrates a known embodiment of such an instrument acting as a volt-meter the results provided by which are excellent. This voltmeter includes chiefly two pairs of electronic tubes, the first pair being constituted by pentodes and the second pair by triodes. This forms, as will be readily ascertained, a balanced system with two amplifying stages.

The use of a balanced system allows in particular, as well known in the art, cutting out any shifting of the zero of the instrument in the case of a modification of the values of the voltages of the supplies feeding the electronic tubes.

In said Fig. 1, 1 and 3 designate the two pentodes of the first stage, while 2 and 4 designate the two triodes of the second stage.

In the pentodes 1 and 3, the suppressor grids are connected with the cathodes and the cathodes are interconnected with each other and with the resistance 5 leading to the negative pole of the high voltage supply 6.

The screen grids of the two pentodes are also interconnected and are further connected through a resistance 7 with the positive pole of the supply 6; this positive pole is also connected directly with the anodes of the triodes 2 and 4 and through the loading resistances 8 and 9 with the anodes of the pentodes 1 and 3.

The cathodes of the two triodes 2 and 4 are interconnected through the four resistances 40—10—11—41 inserted in series. The control grid of the pentode 3 is connected with the connection point between the resistances 11 and 41 inserted in the cathode circuit of the triode 4.

The connection point between the resistances 10 and 11 is connected with the negative pole of the supply 6, and the voltage to be measured is applied between the control grid of the tube 1 and the connection point between the resistances 40 and 10 inserted in the cathode circuit of the triode 2, i. e. between the terminals 12 and 13 shown inside the rectangle 14; the output terminals of the instrument are constituted by the cathodes of the triodes 2 and 4 or, more accurately stated, by the terminals 15 and 16 shown inside the rectangle 17.

The control grid of the triode 2 is connected through a resistance 18 with the anode of the pentode 1 and also through the resistance 19 with the negative pole of the supply 6; similarly, the control grid of the triode 4 is connected through a resistance 20 with the anode of the pentode 3 and also through a resistance 21 with the negative pole of the supply 6.

It is immediately apparent that the tubes 1 and 2 on one hand and the tubes 3 and 4 on the other hand are coupled through resistances. This coupling constituted by the resistances 8, 18 and 19 in the case of the tubes 1 and 2 and by the resistances 9, 20 and 21 in the case of the tubes 3 and 4 provides thus an amplifying stage.

The presence of the resistances 10—40 in the common circuit section of the cathode-grid and cathode-anode circuits of the triode 2, and of the resistance 5 in the common circuit section of the anode-cathode and grid-cathode circuits of the triode 1, has for its object to produce two feedbacks which ensure a linear relationship between the indications of the instrument and the magnitudes to be measured while cooperating in the stability of operation.

The values of the resistances are selected in a manner such as to provide a symmetrical wiring diagram; the immediate conclusion is that, in the case where the terminals 12 and 13 at the input end are at the same potential, there is no difference in voltage between the output terminals 15 and 16 and the symmetry thus obtained remains unaltered, whatever may be the modifications in voltage in the supplies of energy feeding the tubes.

It will, furthermore, be remarked that it is customary not to apply the normal heating voltage to the heating filaments of the cathodes in the pentodes 1 and 3, because experience has proved that the grade of the instrument is improved thereby.

The wiring diagram illustrated in Fig. 1 is well-known per se and may be executed with various modifications: for instance, the resistance 7 in the circuits feeding the screen grids of the pentodes 1 and 3 may be omitted; said screen grids may be connected no longer with the positive pole of the high voltage supply 6 but with a point at an intermediate voltage obtained e. g. by means of a potentiometer connected across the terminals of the supply 6.

My invention has for its object improvements in the wiring diagram of Fig. 1, said improvements leading to various advantages as disclosed hereinafter, reference being made to accompanying drawings wherein:

Fig. 1 is a conventional wiring diagram as described hereinabove;

Fig. 2 is an improved wiring diagram according to my invention;

Figs. 3, 4 and 5 relate to details.

The same reference numbers designate the same parts in Fig. 1 and in Fig. 2; it is, therefore, unnecessary to describe again in full detail the different circuits and I will merely point out the differences between the wiring diagram of Fig. 2 and that of Fig. 1, said differences provided by my invention being as follows:

In the first place, the diagram of Fig. 1 described hereinabove shows the screen grids of the pentodes as interconnected, their common point being connected in its turn through the resistance 7 with the positive pole of the high voltage supply 6. Now, in the diagram of Fig. 2, this is modified in so far that further auxiliary resistances 28 and 29 are inserted in series with the resistances 8 and 9 between the positive pole of the supply 6 and the anodes of the pentodes 1 and 3. The screen grid of the pentode 1 is connected through a resistance 35 with the connecting point between the resistances 9 and 29 inserted in the loading circuit for the pentode 3 and, similarly, the screen grid of the pentode 3 is connected through a resistance 34 with the connecting point between the resistances 8 and 28 inserted in the loading circuit of the pentode 1.

It has already been proposed, it is true, to cross the feeding circuits of the screen grids, each of the latter being connected directly with the anode of the symmetrical pentode. Such a diagram leads to the drawback of a rapid saturation of the tubes and consequently to a reduction in the width of the range of operation of the system.

The wiring diagram according to my invention cuts out this drawback by reason of the presence of the resistances 34 and 35 in the circuits of the screen grids and by reason of the fact that each of said resistances is connected no longer with the anode of the symmetrical tube but with an intermediate point of the loading resistance inserted in the anode circuit of said symmetrical tube.

A further advantage obtained in accordance with my invention consists in that the input tubes operate in the vicinity of the cut-off point, i. e. with very small anode currents and a disturbing grid current which is lower than $10^{-11}$ amperes.

In conformity with theory, experience has shown that the interchange thus provided for the feeding of the screen grids, as ensured respectively through a point of the loading resistance of the opposite tube, allows cutting out the apparent resistance at the output of the instrument, i. e. the apparent resistance between the output terminals 15 and 16. This fact may be explained as follows: it is known that the voltage of the screen grid controls, to a slight extent, the electronic flow and consequently the anode current flowing out of the corresponding tube. The feeding of the screen grid of a tube, no longer through the positive pole of the supply 6 but through an intermediate point of the anodic resistance loading said tube, i. e. the point connecting the resistances 8 and 28 or the resistances 9 and 29, would produce a feedback. More specifically, if the screen grid of the tube 1 were fed through the connecting point between the corresponding resistances 8 and 28, the feedback would lead to a reduction in sensitivity.

The fact of inserting the auxiliary resistances 28 and 29 and of feeding the screen grids through the connecting points between the resistances 8, 28 on one hand and 9, 29 on the other hand, while producing simultaneously an interchange between the leads feeding said screen grids, allows obtaining a suitably directed back coupling providing an increase in sensitivity and, as may be calculated, this cuts out the apparent resistance at the output of the instrument.

Furthermore, the screen grids of said tubes 1 and 3 are interconnected through an adjustable resistance 30 shunted by a condenser 31 of constant capacity. Theory shows and experience confirms that the adjustment of the resistance 30 allows adjusting the gain of the amplifying stages and bringing it to its optimum value, the condenser 31 having for its object an increase in the stability of operation of the system. As a matter of fact, this adjustable resistance 30 allows adjusting the amount of back coupling produced by the interchange or crossing of the screen grid-feeding leads, as described hereinabove.

In addition to the above improvement and to enhance its effect, a further improvement is incorporated into the wiring diagram of Fig. 2. As a matter of fact, in the wiring diagram illustrated in Fig. 1, the grid of the triode 2 is connected with the corresponding cathode through the resistances 19, 10 and 40 and similarly the grid of the triode 4 is connected with the corresponding cathode through the resistances 21, 11 and 41.

In the wiring diagram of Fig. 2, in contradistinction, the resistances 40 and 41 of Fig. 1 are cut out, this cutting out being made possible by the above described modification in the interconnection between the screen grids of the pentodes.

According to my invention, further resistances are inserted for direct connection between the grid and the cathode of both triodes, to wit: a resistance 32 between the grid and the cathode of the tube 2 and a resistance 33 between the grid and the cathode of the tube 4; calculation and experience show that the insertion of said resistances 32 and 33 provides both for an increase in the apparent resistance across the input terminals, i. e. the terminals 12 and 13, and an increase in the gain of the converter instrument.

This result is ascribable in particular to the fact that the presence of said resistances 32—33 allows suitably defining the biasing voltage of the grids of the tubes 2 and 4, while allowing the cathode-biasing resistances 10 and 11 to be defined by other factors.

This improvement is all the more important in the case of an electronic voltmeter where it is necessary to take into account the effect of reverse grid currents flowing from the grid towards the cathode as a consequence of the presence of ions produced by the gases remaining in the tube, whatever may be the degree of vacuum produced therein.

The improvements provided by my invention allow executing an instrument the input resistance of which, when acting as a voltmeter, is of a magnitude of 6 million megohms. This input resistance is practically reduced to zero when the instrument serves as a micrometer, as described hereinafter. The output resistance which is equal to zero allows using the instrument as an indicator, an ordinary milliammeter, the resistance of which is equal to 200 ohms and the maximum deflection of which is obtained for a current of 1 milliampere.

The instrument according to my invention allows measuring readily intensities of a magnitude of one thousandth of a microampere and it allows also resorting to vacuum tubes of a standard type without any special selection of said tubes being required.

The wiring diagram disclosed provides a self-regulation which prevents the instrument from being sensitive to the modifications in the feed voltage, which modifications may reach a figure as high as 40% when the tube voltages are obtained from the mains.

A high grade condenser connected during several hours between the input terminals is not unloaded to any substantial extent, which shows how extremely high the input resistance is and this allows forming an electronic storing instrument leading to novel applications in the field of measures of differential phenomena and as an integrator.

Fig. 3 illustrates a detail corresponding to a modification in the instrument with a view to obtaining different sensitivities, said figure showing only those elements that are required for understanding said modifications.

This Fig. 3 shows again the rectangle 14 with the input terminals 12 and 13 across which is applied the voltage to be measured, the tubes 2 and 4 being illustrated by their cathodes connected with the resistances 10 and 11.

According to the modification illustrated in Fig. 3, a further potentiometer 43 is fitted between the cathodes 2 and 4, and the terminal 13 may be connected through the agency of a switch with any selected tapping of the series of tappings provided on said potentiometer, say the second tapping in the case illustrated. All other conditions remaining unaltered, calculation shows and experience proves that the shifting of the connection from one tapping to another allows modifying the sensitivity of the instrument, which instrument plays then a double part, to wit that of a simple impedance converter, when the terminal 13 is connected with the upper tapping, or that of a converter associated with an electronic amplifier in the case of any other tapping being used.

The advantageous properties of my improved instrument allow resorting to a single gauging for the different sensitivities thus provided, whereby an instrument of a very low cost price may be obtained.

Fig. 4 illustrates an application of the instrument as a microammeter having an apparent input resistance equal to zero. Said figure shows again the rectangle 14 with the terminals 12 and 13 and the rectangle 17 with the terminals 15 and 16; said terminals 12 and 13 are shunted in the case of Fig. 4 by a suitable resistance 45 while the input terminals of the actual measuring instrument are constituted by the terminal 46 connected with the terminal 12 and by the terminal 47 connected with the terminal 16, the current to be measured flowing through the different circuits of the instrument according to my invention.

It will be remarked that the instrument according to my invention may operate as an integrator, i. e. it may serve for measuring amounts of electricity, the wiring diagram being in this case that illustrated in Fig. 5. In said figure, a condenser 46' is shown as inserted across the terminals 12—13; the amount of electricity to be measured is fed across the terminals 48 and 49 of which the former is connected with the terminal 12 and the latter with the terminal 16.

It will be readily ascertained that by reason of the properties of the instrument described, the amount of electricity to be measured is wholly transferred into the condenser 46' the voltage across the terminals of which forms consequently a measure of the said amount of electricity.

This wiring diagram obviously permits using the instrument as a capacitive sounding device for measuring very high voltages.

These different applications are possible by reason of the fact that the apparent resistance at the input of the instrument may be rendered practically infinite.

It will also be remarked that the above-disclosed improvements allow reducing to a negligible amount the influence of the modifications in the characteristic curve of the tubes, which modifications result from the various effects of age on the different tubes.

Obviously, the instrument may serve for the measurement of alternating current voltages, said voltages having been previously rectified by means of any suitable rectifier system.

The instrument may also serve as an ohmmeter and may measure considerable resistances as high as 1,000,000 megohms and even more.

An auxiliary consequence of the improvements provided by the invention consists in the fact that the voltages used for heating the pentodes 1 and 3 may be reduced to a minimum; for instance, it is possible to obtain a highly satisfactory operation by resorting to tubes the heating voltages of which are normally equal to 6.3 volts while the tubes are actually fed under a voltage of 3 to 4 volts.

It is possible to increase the gain of the instrument by inserting between the tubes 1 and 2 and also between the tubes 3 and 4 an auxiliary stage connected in the manner of a cathodyne.

Of course, various other modifications may be brought to the embodiments of the invention disclosed without unduly widening thereby the scope of the accompanying claims.

What I claim is:

1. An amplifier chiefly for connection with a measuring instrument comprising a first stage including a first impedor, two pentodes having cathodes and suppressor grids which are all interconnected, screen grids interconnected by said first impedor, control grids and anodes, a second stage including two vacuum tubes having each a cathode, an anode and a control grid connected with the anode of the corresponding pentode, a supply of electric energy the negative terminal of which feeds the cathodes of the pentodes, second impedors, the negative terminal feeding the cathodes of the tubes of the second stage via the second impedors, the positive terminal of said supply of electrical energy feeding the anodes of said pentodes and tubes, a loading resistance inserted between the positive terminal of the source of energy and the anode of each pentode, means for connecting the screen grid of each pentode with an intermediate point of the loading resistance of the other pentode, input terminals inserted between the control grid of one of the pentodes and the cathode of the corresponding tube of the second stage, a connection between the control grid of the other pentode and the cathode of the corresponding tube of the second stage and output terminals connected with the cathodes of the tubes of the second stage respectively.

2. An amplifier chiefly for connection with a measuring instrument comprising a first stage including a first impedor, two pentodes having cathodes and suppressor grids which are all interconnected, screen grids interconnected by said first impedor, control grids and anodes, a second stage including two vacuum tubes having each a cathode, an anode and a control grid connected with the anode of the corresponding pentode, a supply of electric energy the negative terminal of which feeds the cathodes of the pentode, second impedors, the negative terminal feeding the cathodes of the tubes of the second stage via the second impedors, the positive terminal of said supply of electrical energy feeding the anodes of said pentodes and tubes, a loading resistance inserted between the positive terminal of the source of energy and the anode of each pentode, means for connecting the screen grids of each pentode with an intermediate point of the loading resistance of the other pentode, equal resistances inserted in both last mentioned connecting means, input terminals inserted between the control grid of one of the pentodes and the cathode of the corresponding tube of the second stage, a connection between the control grid of the other pentode and the cathode of the corresponding tube of the second stage and output terminals connected with the cathodes of the second stage respectively.

3. An amplifier chiefly for connection with a voltmeter, microammeter, coulometer and the like, and a measuring instrument, comprising a first stage including a first impedor, two pentodes having cathodes and suppressor grids which are all interconnected, screen grids interconnected by said first impedor, control grids and anodes, a second stage including two vacuum tubes having each a cathode, an anode and a control grid connected with the anode of the corresponding pentode, a supply of electric energy the negative terminal of which feeds the cathodes of the pentodes, second impedors, the negative terminal feeding the cathodes of the tubes of the second stage via said second impedors, the positive terminal of said supply of electric energy feeding the anodes of said pentodes and tubes, a loading resistance inserted between the positive terminal of the source of energy and the anode of each pentode, means for connecting the screen grid of each pentode with an intermediate point of the loading resistance of the other pentode, input terminals inserted between the control grid of one of the pentodes and the cathode of the corresponding tube of the second stage, a connection between the control grids of the other pentode and the cathode of the corresponding tube of the second stage, output terminals connected with the cathodes of the tubes of the second stage respectively, a third impedor coupling said input terminals, and auxiliary terminals for the measuring instrument connected respectively with the input terminal connected with the control grid of a pentode and with the output terminal connected with the cathode of the second stage tube corresponding to the other pentode.

4. An amplifier chiefly for connection with a measuring instrument comprising a first stage including two pentodes having cathodes and suppressor grids which are all interconnected, screen grids, control grids and anodes, an adjustable resistance coupling the screen grids of the two pentodes, a condenser inserted shuntwise across the terminals of said adjustable resistance, a second stage including two vacuum tubes having each a cathode, an anode and a control grid connected with the anode of the corresponding pentode, a supply of electric energy the negative terminal of which feeds the cathodes of the pentodes impedors, the negative terminal feeding the cathodes of the tubes of the second stage via said impedors, the positive terminal of said supply of electrical energy feeding the anodes of said pentodes and tubes, a loading resistance inserted between the positive terminal of the source of energy and the anode of each pentode, means for connecting the screen grid of each pentode with an intermediate point of the loading resistance of the other pentode, input terminals inserted between the control grid of one of the pentodes and the cathode of the corresponding tubes of the second stage, a connection between the control grid of the other pentode and the cathode of the corresponding tube of the second stage and output terminals connected with the cathodes of the tubes of the second stage respectively.

5. An amplifier chiefly for connection with a measuring instrument comprising a first stage including a first impedor, two pentodes having cathodes and suppressor grids which are all interconnected, screen grids interconnected by said first impedor, control grids and anodes, a second stage including two vacuum tubes having each a cathode, an anode and a control grid connected with the anode of the corresponding pentode, a resistance connecting the cathode and the control grid of each second stage tube, second impedors, a supply of electric energy the negative terminal of which feeds the cathodes of the pentodes and, via said second impedors, the cathodes of the tubes of the second stage and the positive terminal of which feeds the anodes of said pentodes and tubes, a loading resistance inserted between the positive terminal of the source of energy and the anode of each pentode, means for connecting the screen grid of each pentode with an intermediate point of the loading resistance of the other pentode, input terminals inserted between the control grid of one of the pentodes and the cathode of the corresponding tube of the second stage, a connection between the control grid of the other pentode and the cathode of the corresponding tube of the second stage and output terminals connected with the cathodes of the tubes of the second stage respectively.

6. An amplifier chiefly for connection with a voltmeter, microammeter, coulometer and the like, and a measuring instrument comprising a first stage including two pentodes having cathodes and suppressor grids which are all interconnected, screen grids, control grids and anodes, an adjustable resistance coupling the screen grids of the two pentodes, a condenser inserted shuntwise across the terminals of said adjustable resistance, a second stage including two vacuum tubes having each a cathode, an anode and a control grid connected with the anode of the corresponding pentode, a resistance connecting the cathode and the control grid of each second stage tube, impedors a supply of electric energy the negative terminal of which feeds the cathodes of the pentodes and via said impedors, the cathodes of the tubes of the second stage and the positive terminal of which feeds the anodes of said pentodes and tubes, a loading resistance inserted between the positive terminals of the source of energy and the anode of each pentode, means for connecting the screen grid of each pentode with an intermediate point of the loading resistance of the other pentode, equal resistances inserted in both last mentioned connecting means, input terminals inserted between the control grids of one of the pentodes and the cathode of the corresponding tube of the second stage, a connection between the control grid of the other pentode and the cathode of the corresponding tube of the second stage, output terminals connected with the cathodes of the tubes of the second stage respectively, an impedor coupling said input terminals, and auxiliary terminals for the measuring instrument connected respectively with the input terminal connected with the control grid of a pentode and with the output terminal connected with the cathode of the second stage tube corresponding to the other pentode.

No references cited.